Patented Sept. 15, 1953

2,652,376

UNITED STATES PATENT OFFICE 2,652,376

EPOXIDE RESINS HEATED WITH VEGETABLE OILS IN THE PRESENCE OF STEAM

Jacobus Rinse, Bernardsville, N. J.

No Drawing. Application May 4, 1951,
Serial No. 224,660

11 Claims. (Cl. 260—18)

This invention relates to resinous oil products and processes of producing the same, and more particularly, to reaction products of drying oils with epoxy resins in the presence of water or steam.

The object of the invention is to provide a new series of resinous oil products suitable for the production of coatings, adhesives and other materials used in industrial processes.

In a most important embodiment of the process, linseed oil or other drying oil is heated with an equal or lesser amount of an epoxy resin having an epoxide equivalent of from 500–1900 in the presence of steam and of a lead catalyst until a homogeneous, clear resinous oil product is obtained.

The lead catalyst is preferably composed of lead oxide, but metallic lead and all lead compounds as a class appear to be very active. Through the use of lead catalysts the reaction proceeds at a quite rapid rate and is generally completed in about an hour.

The drying oil component may be of any character including drying oils and semi-drying oils, for all such materials appear to be operable. Such oils may be in the raw state or bleached state or polymerized state. As specific and preferred examples, there may be mentioned linseed oil and soy bean oil, both of which are fatty acid esters.

The epoxy resin component of the present invention may be any of the available ethoxyline resin products on the market, including the Epon products of the Shell Chemical Corporation and the Araldite products of the Ciba Company. Although such resins having any molecular weight and epoxy equivalent are operable, those resins having a lower molecular weight and an epoxy equivalent of from 450 to 550 are preferred. Epoxy resins having an epoxide equivalent as high as 1900 or higher may be used advantageously in the production of specific resinous oil products having special properties.

In the literature, the epoxy or ethoxyline resins are described as being produced by reacting polyhydroxy hydrocarbons including phenols such as resorcinol, glycerin, bis-phenols, as bis-phenol A, and diphenylol-propane with epichlorhydrin or dichlorhydrin in the presence of an inorganic or organic base in aqueous or alkaline solution, preferably with the application of heat thereby forming a thermoplastic resin, and then subsequently polymerizing said intermediate resin by heating in the presence of an amine catalyst. The epoxy resin used in the present process is in the intermediate thermoplastic stage and hence contains free epoxy groups which are reactive with the drying oil and steam under the conditions hereinbefore disclosed.

The proportions of the reactants are not critical and can be varied within wide limits. For the production of preferred products, the oil component is present in an amount in excess of that of the epoxy resin. The invention contemplates using 5 to 100% resin or more in relation to the oil component. All compositions in which either component is present in an appreciable amount lead to products of new properties.

Fundamentally considered, the reaction of the components is brought about by the action of steam at elevated temperatures. The heating may be effected by means of direct steam alone or the steam may be supplemented by indirect heat applied to the walls of the reaction vessel. By maintaining a flow of steam through the reacting mass, adequate steam for the reaction is assured. Temperatures of at least 150° C. are generally required and temperatures within the range of 180° to 250° C. are preferred. As to the upper limit, it is necessary only to avoid temperatures which distill off the oil component or which cause unwanted polymerization.

The reaction between the drying oil, the epoxy resin and steam will proceed quite slowly in the absence of any added catalyst. Hence the invention primarily contemplates procedures in which the rate of reaction is increased by the addition of a suitable catalyst. Any of the known alcoholizing catalysts may be used, examples of which are tin foil, tin compounds, and sodium, potassium and barium compounds, as their hydroxides and carboxylates, including soaps. With these mentioned catalysts, excepting those of sodium and potassium, the reaction may take eight hours or longer to go to completion. The short reaction period of only an hour required for lead catalysts and other advantages makes the processes using such catalysts of outstanding practical value.

The exact course of the reaction and the structures of the reaction products have not been definitely established, but it appears that the heat and steam may hydrolyze the epoxy groups of the resin while simultaneously a portion of the fatty acid radicals, split from the glycerin radical, are transferred to the resin molecules at the formed hydroxyl groups, in an exchange esterification.

In the following examples, the resins employed were derived from bis-phenol, and the parts are by weight.

Example 1

One hundred parts of refined linseed oil are heated with twenty parts of an epoxy resin having an epoxy equivalent of 1600–1900 at a temperature of 200° C. in the presence of one per cent of lead stearate, during which heating a stream of steam is blown through the reaction mixture. In a period of about one hour, the reaction product takes on the appearance of a clear viscous oil and the heating is discontinued. The resinous oil product obtained when mixed with a liquid butylated urea-formaldehyde coating resin dissolved in butanol provides a baking varnish of high quality.

*Example 2*

One hundred parts of bodied linseed oil having a viscosity of Z1 is heated with 60 parts of an epoxy resin having an epoxy equivalent of 500 in the presence of 0.5% lead oxide while a stream of steam is blown through the reaction mixture and a temperature of 210° to 230° C. is maintained therein. When a clear reaction product is obtained the heating is discontinued. The product is a stiff viscous resin.

*Example 3*

One hundred parts of soy bean oil are heated with one hundred parts of an epoxy resin having an epoxy equivalent of 500 in the presence of one per cent lead naphthenate, while steam is blown through the reaction mixture and the temperature maintained at 170° C. When a clear product is obtained the reaction is discontinued. The clear resin obtained may be reacted further with linseed oil fatty acids.

*Example 4*

One hundred parts of soy bean oil together with twenty-five parts of ethoxyline resin and one per cent sodium oleate are heated in the presence of direct steam for a period of thirty minutes whereupon a clear oil product is obtained. Although this reaction proceeds with great rapidity, the reaction product may gel on cooling and the sodium catalyst remains in the oil product. This product accordingly is of limited value or rather limited in its field of utility.

The resinous oil products of the present invention are suitable for a number of purposes in industry such as for the production of various esterification products in combination with carboxylic acids and for the production of etherification products with urea resins by which exceptionally stable coatings may be produced. The addition of conventional driers to the coating compositions may be desirable and the hardening of the coatings may be effected by air drying or oven drying. Such products are also suitable for the production of adhesives.

It should be understood that the present invention is not limited to the specific details herein given except where indicated and that the invention extends to all equivalent materials and conditions which will occur to those skilled in the art upon consideration of the terms and breadth of the claims appended hereto.

I claim:

1. The process for producing resinous oil products which comprises, reacting a fatty acid ester drying oil with an epoxy resin containing free epoxy groups in the presence of steam at a temperature of at least 150° C.

2. The process for producing resinous oil products which comprises, mixing together a fatty acid ester drying oil and an epoxy resin containing free epoxy groups and heating the resulting mass to a temperature of at least 150° C. while introducing steam through said mass, until reaction occurs and a clear reaction mass is obtained.

3. The process for producing resinous oil products which comprises, reacting a fatty acid ester drying oil with an epoxy resin containing free epoxy groups in the presence of steam and of an alcoholizing catalyst at a temperature of at least 150° C.

4. The process for producing resinous oil products which comprises, mixing together a fatty acid ester drying oil, an epoxy resin containing free epoxy groups and an alcoholizing catalyst, and heating to a temperature of at least 150° C. while introducing steam, until reaction occurs and a clear reaction mass is obtained.

5. The process for producing resinous oil products which comprises, reacting a fatty acid ester drying oil with an epoxy resin containing free epoxy groups in the presence of steam and of a lead catalyst at a temperature of at least 150° C.

6. The process for producing resinous oil products which comprises, mixing a fatty acid ester drying oil with an epoxy resin containing free epoxy groups and a lead catalyst, and heating the resulting mass to a temperature of at least 150° C. while passing steam through said mass, until reaction occurs and a clear reaction mass is obtained.

7. The process for producing resinous oil products which comprises, reacting a fatty acid ester drying oil with an epoxy resin containing free epoxy groups in the presence of steam and a lead compound as a catalyst at a temperature of at least 150° C.

8. The process for producing resinous oil products which comprises, mixing together a fatty acid ester drying oil, an epoxy resin containing free epoxy groups and lead oxide as a catalyst, and heating the resulting mass to a temperature of at least 150° C. while introducing steam, until reaction occurs and a clear reaction mass is obtained.

9. The process for producing resinous oil products which comprises, reacting a fatty acid ester drying oil with an epoxy resin of lower molecular weight containing free epoxy groups having an epoxide equivalent of 450 to 550 in the presence of steam and a lead catalyst at a temperature of at least 150° C.

10. The process for producing resinous oil products which comprises, mixing together a fatty acid ester drying oil, an epoxy resin of lower molecular weight containing free epoxy groups having an epoxy equivalent of 450 to 550 and a lead compound catalyst, and heating the resulting mass to a temperature of at least 150° C. while introducing steam, until reaction occurs and a clear reaction mass is obtained.

11. The process for producing resinous oil products which comprises, mixing together linseed oil, an epoxy resin containing free epoxy groups and a lead catalyst, heating the resulting mass to a temperature of from 180° to 250° C. while introducing steam into the reaction mixture, until reaction occurs and a clear reaction mass is obtained.

JACOBUS RINSE.

References Cited in the file of this patent

UNITED STATES PATENTS

| Number | Name | Date |
|---|---|---|
| 2,493,486 | Greenlee | Jan. 3, 1950 |